(12) United States Patent
Crast et al.

(10) Patent No.: US 6,365,679 B1
(45) Date of Patent: *Apr. 2, 2002

(54) TWO COMPONENT POLYURETHANE CLEAR COAT FOR GOLF BALLS

(75) Inventors: Steven C. Crast; Ramon B. Dineros, both of Oceanside; Michael G. Lucero, San Marcos, all of CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/496,125

(22) Filed: Feb. 1, 2000

(51) Int. Cl.[7] .................. A63B 37/14; C09D 175/06
(52) U.S. Cl. .................. 525/440; 524/872; 528/27; 528/66; 528/67; 528/73; 528/83; 473/351; 473/371; 473/378
(58) Field of Search .................. 524/872; 525/440; 528/66, 73, 83, 27, 67; 473/351, 371, 378

(56) References Cited

U.S. PATENT DOCUMENTS

| 4,788,262 A | * | 11/1988 | Markusch |
| 5,409,233 A |   | 4/1995  | Kennedy |
| 5,459,220 A |   | 10/1995 | Kennedy |
| 5,461,109 A |   | 10/1995 | Blair et al. |
| 5,820,491 A | * | 10/1998 | Hatch |
| 6,018,012 A | * | 1/2000  | Crast |
| 6,063,859 A | * | 5/2000  | Yamamoto |
| 6,184,332 B1 | * | 2/2001 | Dos Santos |

FOREIGN PATENT DOCUMENTS

| WO | 97/31964 | * | 9/1997 |

* cited by examiner

Primary Examiner—David J. Buttner
(74) Attorney, Agent, or Firm—Michael A. Catania

(57) ABSTRACT

A two component polyurethane clear coat for use with golf balls includes a polyol component and a polyisocyanate component. The polyol component includes a polyester polyol resin containing a neopentyl glycol resin. A mixture of silane and aziridine is also preferably included in the polyol component. The polyisocynanate component includes a mixture of an isocyanate trimer of hexamethylene diisocyanate and a biuret of hexamethylene diisocyanate. The polyol and polyisocyanate components preferably include two solvents forming a blend selected from the group of ethyl acetate, butyl acetate, propyleneglycolmonomethylether acetate, toluene and xylene. The coating may be applied directly to golf ball covers with a variety of chemistries without the need of a primer or basecoat. The clear coat provides superior adhesion and abrasion resistance in addition to improving the drying and curing characteristics.

1 Claim, No Drawings

TWO COMPONENT POLYURETHANE CLEAR COAT FOR GOLF BALLS

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The field of the invention is clear coats for use on the exterior of substrates. More specifically, the invention relates to coatings applied to the exterior of golf balls.

2. Description of the Related Art

Clear coats are used on the exterior surfaces of a variety of substrates. Clear coats serve to enhance the aesthetic appearance of the substrate as well as act as a barrier to protect the substrate from weathering, mechanical agitation and the like. One such substrate in which clear coats are of particular importance is a golf ball.

A golf ball generally comprises a one-piece construction or it may include several layers including a core and an outer cover surrounding the core. Typically, one or more layers of paint and/or clearcoat are applied to the exterior surface of the golf ball. For example, in one typical design, the exterior surface of the golf ball is first painted with at least one clear or pigmented basecoat primer along with at least one application of a clear top coat. The basecoat and/or primer and clear top coat are applied to the golf ball to enhance the aesthetic appearance of the ball as well as mask or cover surface blemishes that may have resulted from the manufacturing process. The clear top coat is particularly important, in that the coat protects any markings, trademarks, logos, or the like that may be placed on the exterior surface of the ball.

Typically, the outer coating layers of a golf ball comprise a primer along with a clear urethane top coat. For example, U.S. Pat. No 5,459,220 discloses a two-pack urethane top coat for a golf ball that uses separate packages of a polyol and diisocyanate that employs biurets and isocyanurate trimers of hexamethylene diisocyanate (HDI) as the crosslinking agents. U.S. Pat. No 5,409,233 discloses a clear coating for use on a golf ball that incorporates a solvent system that includes methylamyl ketone.

Previous clear coat formulations had the disadvantage that they were preferably used with the addition of a basecoat or primer. The elimination of the basecoat or primer is desirous, since the basecoat increases the cost of manufacturing as well as increases the production time of the golf ball. In addition, the primer or basecoat can be the source of volatile organic compounds (VOC's), that from an environmental standpoint, should be reduced or eliminated from the manufacturing process. Moreover, the presence of the primer coat can deleteriously affect the aerodynamic aspects of the golf ball during flight. The uneven distribution of primer over the cover as well as the pooling of primer within the dimples of the golf ball can alter the flight characteristics of the ball. In those instances where the clear coat could be applied directly to the exterior of the cover, the cover had to meet specific chemical requirements such as a high zinc content, or favorable adhesion characteristics.

Consequently, there remains a need for a clear coat that requires no basecoat or primer yet exhibits superior bonding to a variety of golf ball cover chemistries while still retaining superior abrasion resistance and durability.

BRIEF SUMMARY OF THE INVENTION

In a first aspect of the present invention, a golf ball includes an exterior surface surrounded by a polyurethane coating. The polyurethane coating includes a polyester polyol resin containing a neopentyl glycol-based polyol resin, and a polyisocyanate component.

In a second aspect of the invention, a golf ball includes the polyurethane coating according to the first aspect of the invention, wherein the polyisocyanate component is an isocyanurate trimer of hexamethylene diisocyanate.

In a third, separate aspect of the invention, a polyurethane coating comprises a polyol component and a polyisocyanate component. The polyol component includes a mixture of neopentyl glycol resin, silane, aziridine, and a solvent blend including two or more of the solvents selected from the group consisting of ethyl acetate, butyl acetate, propyleneglycolmonomethylether acetate (PM acetate), toluene, or xylene. The polyisocyanate component contains a mixture of an isocyanurate trimer of hexamethylene diisocyanate, a biuret of hexamethylene diisocyanate, and the solvent blend.

Accordingly, it is an object of the present invention to provide a two-component polyurethane clear coat that is capable of being applied directly to a variety of substrates. The two-component polyurethane clear coat can be applied directly to the exterior surface of a golf ball with a wide range of chemistries without the use of a primer or basecoat. The clear coat can be applied and cured in a reasonably short period of time, thus reducing cycle times for the manufacture of balls. The elimination of the primer or basecoat permits greater aerodynamic predictability of the ball's flight characteristics, as well as significantly reduces or eliminates emissions inherent in the primer/basecoat application process.

The benefits of the novel clear coat are superior resistance to yellowing and ultraviolet light degradation. The novel clear coat also has excellent adhesion to ionomers, elastomers, rubbers, and like materials that may be used as cover materials for golf balls. The novel clear coat also has superior abrasion resistance.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Though the two-component polyurethane clear coat of the present invention is suitable for use on a range of different substrates such as wood, plastic, rubber, metal, and the like, the following discussion will focus on the use of the two-component polyurethane clear coat on a golf ball. This discussion is for exemplary purposes only, and is not intended to limit the scope of the invention described in the attached claims.

A golf ball generally comprises a one-piece construction or it may include several layers including a core and an outer cover surrounding the core. On the exterior surface of the golf ball is the polyurethane clear coat. The polyurethane clear coat is applied directly to cover. No basecoat or primer is needed for application of the polyurethane clear coat of the present invention. In this way, the deleterious effects of the primer or basecoat can be eliminated.

The exterior surface of the golf ball is preferably made of any number of materials that are based on ionomeric, thermoplastic, elastomeric, urethane, balata (natural or synthetic), polybutadiene or any combination of the above. It has been found that the above listed cover chemistries, when used in connection with the polyurethane clear coat of the present invention provides superior direct-to-cover adhesion and abrasion resistance. Adhesion is used to describe the ease to which the clear coat bonds to the cover and is required to protect any trademark, lettering, logo or the like that is on the golf ball surface. Abrasion, on the other hand, refers to the ability of a ball to retain and maintain its glossiness in response to weathering and use.

The polyurethane clear coat principally includes two components, namely a polyol component and isocyanurate component. According to the present invention, the polyol component preferably comprises a blend of polyester polyol materials containing a polyester polyol resin based on neopentyl glycol. The isocyanurate component preferably comprises a blend of polyisocyanate prepolymers.

A description of the polyol component of the polyurethane clear coat now follows. As recited above, the polyol component includes a blend of polyester polyol materials. According to the present invention, contained within this blend of polyester polyol materials is preferably one or more materials based on neopentyl glycol (NPG), and more preferably polyester polyol resins based on neopentyl glycol. The presence of the polyester polyol resins based on neopentyl glycol allows superior adhesion and abrasion resistance for a variety of golf ball materials. Preferably, the NPG resin comprises between about 40% to about 80% on a weight basis of the polyol component of the clear coat.

To assure a rapid tack-free time, even at elevated bake temperatures, a cure accelerator, or catalyst should be used in the polyol component formulation. Primary and secondary amines, tin-based catalysts, and metallic octoates are catalysts that may be used in the polyol component. A preferred catalyst is dibutyltin dilaureate.

In addition, it is preferable that the polyol component further include an epoxidized silane and a polyfunctional aziridine. The combination of a polyester neopentyl glycol-based polyester polyol(s), silane, and aziridine have been found to result in a superior polyol component with respect to the adhesion, durability, and abrasion resistance of the top coat. A solvent blend is preferably mixed with the polyol component. Additional components of the polyol component can include a thixotropic resin and flow additives.

In the present invention, the solvent blend used in the polyol component of the clear coat may comprise two or more of the following at any ratio: ethyl acetate, butyl acetate, propyleneglycolmonomethyl ether acetate, toluene or xylene.

Table 1 shown below lists on a weight basis the range of the various materials used in the polyol component of the polyurethane clear coat.

TABLE 1

| Polyol Component | |
|---|---|
| MATERIAL | PARTS BY WEIGHT |
| Solvent Blend | 10.0–60.0 |
| Thixotropic Resin | 1.0–3.0 |
| Flow Additive | 0.1–1.0 |
| Epoxidized Silane | 0.1–1.0 |
| Accelerator or catalyst | 0.01–3.00 |
| Polyfunctional Aziridine | 1.0–3.0 |
| NPG Resin(s) | 40.0–80.0 |

A description will now be given of the polyisocyanate component of the clear coat. According to the present invention, the polyisocyanate component preferably includes an isocyanurate trimer of hexamethylene diisocyanate (HDI) in addition to biuret of hexamethylene diisocyanate (HDI). The use of HDI improves the drying and curing characteristics of the clear coat by decreasing drying time while still offering superior abrasion resistance. Preferably, the ratio (weight basis) of the two resins should be about 50% to about 60% of the biuret to about 50% to about 40% of the trimer based on equivalent weights of functional isocyanate. In addition, a solvent blend is preferably a component of the polyisocyanate component of the polyurethane clear coat. The solvent blend used in the polyisocyanate component of the clear coat may comprise two or more of the following at any ratio: ethyl acetate, butyl acetate, propyleneglycolmonomethylether acetate, toluene or xylene.

Table 2 shown below lists on a weight basis the range of the various materials used in the polyisocyanate component of the polyurethane clear coat.

TABLE 2

| Polyisocyanate component | |
|---|---|
| MATERIAL | PARTS BY WEIGHT |
| Solvent Blend | 30.0–60.0 |
| Isocyanurate Trimer of HDI | 10.0–30.0 |
| HDI Biuret | 30.0–50.0 |

Prior to coating the exterior of the golf ball cover, the polyol component and the polyisocyanate component are combined to form the polyurethane top coat. When combining the two components a stoiciometric index ratio of the polyester polyol component to polyisocyanate component should not be less than 1.25:1.00 (NCO:OH) and most preferred within the range of about 1.25 to about 1.50 equivalents of polyisocyanate to 1.00 equivalents polyol. This results in mixing the polyol with the polyisocyanate at ratios (weight basis) ranging from 1:1 up to 5:1, depending on the stoichiometric ratio outlined above.

The two component clear coat is applied to the golf ball by any number of methods commonly known in the art. For example, the clear coat can be directly applied to golf balls using a spray gun or other atomizing device. After spraying, the balls are then cured by heating the balls at a temperature within the range of about 125 degrees F. to about 150 degrees F. At these conditions, the clear coat is then dry-to-touch and can be handled after ten minutes of baking. Complete curing of the balls results in about 72 to about 144 hours after the initial cure.

Thus, a two component polyurethane clear coat is disclosed that can be directly applied to a variety of substrates, i.e., the exterior surface of a golf ball without the aid of a primer or basecoat. The improved clear coat exhibits superior adhesion to a variety of exterior surfaces while maintaining a high abrasion resistance. The polyurethane clear coat also exhibits excellent drying and curing characteristics, which can decrease the production time of a completed ball. However, those skilled in the relevant art will recognize that the clear coat of the present invention may be used with a primer or basecoat without departing from the scope and spirit of the present invention.

A most preferred clear coat formulation for application to a golf ball is set forth below. The polyol component is preferably composed of a solvent blend containing butyl acetate in an amount of 15 wt. % and ethyl acetate in an amount of 39 wt. %. The polyol component also contains NPG resin in an amount of 40 wt. %; polyfunctional aziridine in an amount of 2 wt. %; thixotropic resin in an amount of 1.0 wt. %; epoxidized silane in an amount of 0.5 wt. %; nonionic flow additive in an amount of 0.5 wt. %; and dibutyltin dilaureate (catalyst) in an amount of 2.0 wt. %. In this preferred embodiment, the polyisocyanate component contains ethyl acetate in an amount of 44 wt. %; a trimer of HDI in an amount of 18 wt. %; and a biuret of HDI in an amount of 38 wt. %.

The clear coat of the present invention was applied to two different multiple piece polyurethane covered golf balls, and then compared to the Titleist PROFESSIONAL® golf ball (a polyurethane covered wound core golf ball). The golf balls using the clear coat of the present invention were first coated with a basecoat, and had a thermoset polyurethane cover. The test involved firing the golf balls from an air cannon at 135 feet per second into a solid wall to reflect a golf club hitting a golf ball. The golf balls were then rated from 1 to 5, with 5 being excellent and 1 being poor. The results are shown in Table 3.

TABLE 3

| Ball ID | No. of Hits | Adhes. | Orange Peel | Chipping | Abrasion Resistance | Cracking | Overall Rating | Weighting Average (%) | Overall Weighting Average |
|---|---|---|---|---|---|---|---|---|---|
| Clear coat of present invention on a multi-piece golf ball | 25 | 5 | 5 | 5 | 5 | 5 | 5 | 35 | |
| | 50 | 5 | 5 | 5 | 5 | 4 | 4.8 | 30 | |
| | 75 | 5 | 5 | 5 | 5 | 3 | 4.6 | 25 | |
| | 100 | 5 | 5 | 5 | 5 | 3 | 4.6 | 10 | 4.8 |
| Clear coat of the present invention on a multi-piece golfball | 25 | 5 | 5 | 5 | 4.5 | 5 | 4.9 | 35 | |
| | 50 | 5 | 5 | 5 | 4 | 5 | 4.8 | 30 | |
| | 75 | 5 | 5 | 5 | 3.5 | 4.5 | 4.6 | 25 | |
| | 100 | 5 | 5 | 5 | 3 | 4.5 | 4.5 | 10 | 4.8 |
| Titleist Professional | 25 | 5 | 5 | 5 | 4.5 | 5 | 4.9 | 35 | |
| | 50 | 5 | 5 | 5 | 4 | 5 | 4.8 | 30 | |
| | 75 | 5 | 5 | 4 | 3.5 | 4.5 | 4.4 | 25 | |
| | 100 | 5 | 5 | 4 | 3 | 4.5 | 4.3 | 10 | 4.7 |

From the foregoing it is believed that those skilled in the pertinent art will recognize the meritorious advancement of this invention and will readily understand that while thepresent invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A golf ball comprising:

an exterior surface; and a clear coat applied to the exterior surface, the clear coat formed from a polyol component and a polyisocyanate component, the polyol component formed from a neopentyl glycol resin in an amount of 40 to 80 of the weight percentage of the polyol component, a solvent blend in an amount of 10 to 60 of the weight percentage of the polyol component, a polyfunctional aziridine in an amount of 0.01 to 3.00 of the weight percentage of the polyol component, an epoxidized silane in an amount of 0.1 to 1.0 of the weight percentage of the polyol component, and a thixotropic resin in an amount of 1.0 to 3.0 of the weight percentage of the polyol component, and the polyisocyanate component formed from a solvent blend in an amount of 30 to 60 of the weight percentage of the polyisocyanate component, an isocyanurate trimer of hexamethylene diisocyanate in an amount of 10 to 30 of the weight percentage of the polyisocyanate component, and a biuret of hexamethylene diisocyanate in an amount of 30 to 50 of the weight percentage of the polyisocyanate component.

* * * * *